Figure 1:
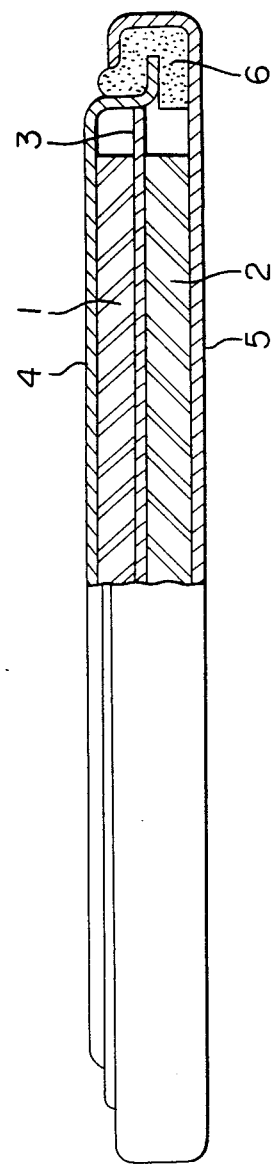

United States Patent [19]

Morimoto et al.

[11] Patent Number: 4,725,926
[45] Date of Patent: Feb. 16, 1988

[54] ELECTRIC DOUBLE LAYER CAPACITOR HAVING HIGH CAPACITY

[75] Inventors: Takeshi Morimoto; Kazuya Hiratsuka; Yasuhiro Sanada; Hiroshi Ariga, all of Yokohama, Japan

[73] Assignees: Asahi Glass Company Ltd., Tokyo; Elna Company Ltd., Fujisawa, both of Japan

[21] Appl. No.: 3,456

[22] Filed: Jan. 15, 1987

[30] Foreign Application Priority Data

Jan. 17, 1986 [JP] Japan .................................. 61-6563

[51] Int. Cl.⁴ .............................................. H01G 9/02
[52] U.S. Cl. ..................................... 361/433; 252/62.2
[58] Field of Search ........................ 361/433; 252/62.2

[56] References Cited

U.S. PATENT DOCUMENTS 3,223,639 12/1965 Powers et al. .................... 252/62.2
4,260,668 4/1981 Pace et al. ...................... 361/433 X Primary Examiner—Donald A. Griffin Attorney, Agent, or Firm—Oblon, Fisher, Spivak, McClelland & Maier

[57] ABSTRACT

An electric double layer capacitor utilizing an electric double layer formed by the interface of an electrolyte solution and polarizable electrodes, wherein the electrolyte solution comprises a quaternary phosphonium salt of the formula I dissolved in an organic solvent:

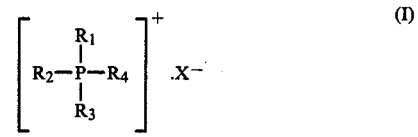

wherein each of $R_1$, $R_2$, $R_3$ and $R_4$ is a hydrogen atom, an alkyl group having from 1 to 15 carbon atoms or an aryl group having from 6 to 15 carbon atoms, provided that not all of $R_1$ to $R_4$ are hydrogen atoms, and X is $BF_4$, $PF_6$, $ClO_4$, $AsF_6$, $SbF_6$, $AlCl_4$ or $R_fSO_3$ wherein $R_f$ is a fluoroalkyl group having from 1 to 8 carbon atoms.

9 Claims, 1 Drawing Figure

ELECTRIC DOUBLE LAYER CAPACITOR HAVING HIGH CAPACITY

The present invention relates to an electrolyte solution for an electric double layer capacitor, and an electric double layer capacitor having high capacity wherein such electrolyte solution are employed.

In recent years, the demand has rapidly increased for an electric double layer capacitor, particularly for a coin-shaped (or button-shaped) cell, as disclosed in European Pat. No. 134706, comprising an electric double layer formed by polarizable electrodes and an electrolyte interface, as a miniature capacitor having a large capacity or as a memory back-up electric power source.

As the solute for an electrolyte solution for an electric double layer capacitor, an alkali metal salt of a perchlorate, a hexafluorophosphate, a borofluoride or a trifluoromethane sulfonate, or a tetraalkylammonium salt, has been proposed (Japanese unexamined patent publications Nos. 6824/1974, 44463/1975 and 2324079/1974).

However, with use of these conventional solutes, no adequate results have been obtained. For instance, even when a tetraalkylammonium salt is employed, the decomposition voltage is small, and the capacitor thereby obtained is not fully satisfactory with respect to the working voltage, the capacity, etc.

It is an object of the present invention to solve the above-mentioned problems inherent to the conventional technique, and to provide an electric double layer capacitor having high working voltage and capacity.

Another object of the present invention is to provide an electrolyte solution for such an excellent electric double layer capacitor.

The present invention provides an electrolyte solution for an electric double layer capacitor which comprises a quaternary phosphonium salt of the formula I dissolved in an organic solvent:

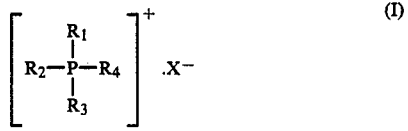

(I)

wherein each of $R_1$, $R_2$, $R_3$ and $R_4$ is a hydrogen atom, an alkyl group having from 1 to 15 carbon atoms or an aryl group having from 6 to 15 carbon atoms, provided that not all of $R_1$ to $R_4$ are hydrogen atoms, and X is $BF_4$, $PF_6$, $ClO_4$, $AsF_6$, $SbF_6$, $AlCl_4$ or $R_fSO_3$ wherein $R_f$ is a fluoroalkyl group having from 1 to 8 carbon atoms.

Further, the present invention provides an electric double layer capacitor utilizing an electric double layer formed by the interface of an electrolyte solution and polarizable electrodes, wherein the electrolyte solution comprises a quaternary phosphonium salt of the formula I dissolved in an organic solvent.

Now, the present invention will be described in detail with reference to the preferred embodiments.

In the accompanying drawing, FIG. 1 is a partially cross-sectional view of an embodiment of the electric double layer capacitor of the present invention.

The electrolyte solution of the present invention has, by itself high electric conductivity and chemical stability, and it is not only durable, but also effective, when used for an electric double layer capacitor, for the improvement of the decomposition voltage. Accordingly, the electric double layer capacitor wherein such an electrolyte solution is used, is superior to the conventional capacitors, particularly in the capacity and working voltage. In a preferred embodiment, the capacitor of the present invention is superior to the conventional capacitors by about 30% in the capacity and by about 15% in the working voltage.

In the present invention, it is important to use a quaternary phosphonium salt of the formula I as the solute for the electrolyte solution. In the formula I for the electrolyte, the moiety in the bracket [ ] represents preferably a tetraalkyl phosphonium or tetraaryl phosphonium group. Here, the four alkyl or aryl groups bonded to the phosphorus atom may be the same to form a symmetrical phosphonium salt, or at least two substituents may be different to form an unsymmetrical phosphonium salt. The alkyl group is preferably a lower alkyl group having from 1 to 4 carbon atoms. The aryl group preferably contains one or two benzene rings, and a phenyl group is particularly preferred. Alkyl and aryl groups may be bonded to the phosphorus atom to form a tetraalkyl-aryl phosphonium salt.

As the symmetrical quaternary phosphonium, tetramethyl phosphonium, tetraethyl phosphonium, tetrapropyl phosphonium or tetrabutyl phosphonium is preferred from the viewpoint of the solubility and availability.

On the other hand, as the asymmetrical quaternary phosphonium, methyltriethyl phosphonium, dimethyldiethyl phosphonium, ethyltrimethyl phosphonium, diethyldibutyl phosphonium, propyltributyl phosphonium or triphenylethyl phosphonium is preferred. Among them, dimethyldiethyl phosphonium, ethyltrimethyl phosphonium and butyltriphenyl phosphonium are particularly preferred in view of the solubility to the solvent and availability.

In the above formula I, X is tetrafluoroboric acid ($BF_4$), hexafluorophosphoric acid ($PF_6$), perchloric acid ($ClO_4$), hexafluoroarsenic acid ($AsF_6$), hexafluoroantimonic acid ($SbF_6$), tetrachloroaluminic acid ($AlCl_4$) or $R_fSO_3$ wherein $R_f$ is a fluoroalkyl group having from 1 to 8 carbon atoms, preferably from 1 to 4 carbon atoms. Among them, $BF_4$ or $PF_6$ is particularly preferred, since a higher working voltage and capacity are attained.

The concentration of such a solute in the electrolyte solution is preferably from 0.1 to 3.0 M, more preferably from 0.5 to 1.5 M. If the concentration is too low, the loss in capacity increases as the internal resistance increases. On the other hand, if the concentration is too high, there will be a difficulty particularly under a cold condition such that the reliability decreases as the solute precipitates.

In the present invention, there is no particular restriction as to the type of the organic solvent, and conventional known or well known various types of organic solvents may be employed. Electrochemically stable non-aqueous solvents such as propylene carbonate, γ-butyrolactone, acetonitrile, dimethylformamide, 1,2-dimethoxy ethane, sulfolane and nitromethane may preferably be employed alone or in combination as a mixture. Such a solvent is preferably used in a substantially anhydrous condition.

Among them, propylene carbonate, γ-butyrolactone and sulfolane may preferably be used alone or in combination as a mixture.

An electric double layer capacitor can be obtained by sandwiching a porous separator between a pair of electrodes impregnated or filled with the electrolyte solution of the present invention, and sealing the sandwiched assembly in a casing.

There is no particularly restriction as to the material for the polarizable electrodes to be used in the present invention. However, it is preferred to employ activated carbon powder or activated carbon fiber which is electrochemically inert to the electrolyte solution, and which has a large specific surface area.

Particularly, an electrode obtained by adding a binder such as polytetrafluoroethylene (PTFE) to activated carbon powder, rolling the mixture to form a sheet, and preferably subjecting the sheet to mono- or bi-axial stretching, is preferably employed, since it is superior in the capacity per unit volume, in the strength and in the dependability for a long period of time.

As the porous separator, for instance, a non-woven fabric of polypropylene or a glass fiber-incorporated cloth, may be used. The separator usually has a thickness of from 50 to 200 $\mu$m, preferably from 100 to 150 $\mu$m.

The electrolyte solution of the present invention is useful for electric double layer capacitors of both types of a spiral structure and a coin-shaped structure. The spiral structure (as shown in FIG. 2 of European Pat. No. 134706) may be prepared by rolling a metal net current collector and a polarizable electrode to form a polarizable electrode, sandwiching the above-mentioned separator impregnated with the electrolyte solution of the present invention by a pair of the polarizable electrodes, coiling the polarizable electrode together with the separator to form an assembly of a spiral structure wherein the polarizable electrodes face to each other with the separator interposed therebetween, and placing the assembly in a casing.

The coin-shaped structure (as shown in FIG. 4 of European Pat. No. 134706) comprises an assembly of a pair of sheet-shaped polarizable electrodes and a separator interposed between the electrodes and impregnated with the electrolyte solution of the present invention, a metal casing accommodating the assembly and electrically connected at its bottom to one of the polarizable electrodes, a metal cover for the metal casing, connected to the other electrode, and a sealing material interposed between and electrically insulating the periphery of the metal cover and the open edge of the metal casing and integrally caulked by the open edge of the metal casing. The electrical contact between the metal cover and the polarizable electrode or between the metal casing and the polarizable electrode, is conducted by a suitable current collector such as a metal net or a conductive adhesive.

The electrolyte solution of the present invention is useful particularly for an electric double layer capacitor having the coin-shaped structure, because the coin-shaped cell is required to be small in size and yet to have a large capacity per prescribed volume and high mechanical strength particularly against cracking and breakage so that the cell is useful for portable-type electric devices (such as clocks, watches, televisions or video tape recorders, etc.).

Now, the present invention will be described in further detail with reference to Examples. However, it should be understood that the present invention is by no means restricted to these specific Examples.

EXAMPLES 1 to 14

In the following Examples and Comparative Examples, the test apparatus was assembled as follows:

Firstly, in an internally threaded cylindrical nickel container having a bottom, an activated carbon fiber cloth (specific surface area: 2000 $m^2/g$, 3.14 $cm^2$, 0.4 mm in thickness) as a cathode side polarizable electrode, a separator made of a non-woven fabric of polypropylene (4.9 $cm^2$, 0.4 mm in thickness) and an activated carbon fiber cloth (3.14 $cm^2$, 2 mm in thickness) as an anode side polarizable electrode each impregnated with an electrolyte solution to be tested, were overlaid one after another. In this case, the activated carbon fiber cloths were arranged to face each other with the separator interposed therebetween.

Then, an externally and internally threaded ring of polytetrafluoroethylene was screwed in this container to fix the positions of the activated carbon fiber cloths and the separator.

Then, a threaded rod of polytetrafluoroethylene having provided at the forward end with a platinum net current collector (200 mesh) having a platinum lead wire, was screwed in the opening of the above-mentioned ring. The assembling was completed by confirming the electric connection of the platinum lead wire and the nickel container by an AC two-terminal method using a LCR meter. The platinum lead wire was led out through a hole provided at the center of the above-mentioned rod.

By using the test apparatus assembled as described above, the properties of capacitors in which various electrolyte solutions comprising the solutes and solvents as identified in Table 1, were evaluated. In Table 1, TEP represents tetraethyl phosphonium, TMP represents tetramethyl phosphonium, and TPP represents tetraphenyl phosphonium.

The evaluation was made with respect to the capacity and the decomposition voltage of the electrolyte solution as an index for the working voltage. The measurements were conducted, respectively, as follows.

For the measurement of the capacity, the separator and the activated carbon fiber cloths impregnated with the predetermined electrolyte solution, were set in the container, and then charging was conducted at a constant voltage of 1.8 V for 1 hour. Then, discharging was conducted at a constant current of 1 mA, whereby the time until the terminal voltage during the discharging became 0 V was measured, and the capacity was calculated from the measured value.

For the measurement of the decomposition voltage, the test capacitor was set in the same manner as in the measurement of the capacity, and then a direct current voltage was applied. Ten minutes later, the leakage current (LC) was measured, and the point where LC increased abruptly relative to the value at the initiation of the application of the voltage, was taken as the decomposition voltage of the electrolyte solution.

The results of the tests in which the type of the electrolyte solution was varied, are shown in Table 1. The concentration of the solute was 1 M in each case, and Example 14 represents a conventional electrolyte solution for the purpose of comparison.

TABLE 1

| No. | Electrolyte solutions Solute | Solvent | Capacity (F/g) | Decomposition voltage (V) |
|---|---|---|---|---|
| 1 | TEP CF$_3$SO$_3$ | Propylene carbonate | 110.5 | 5.5 |
| 2 | TEP BF$_4$ | Propylene carbonate | 113.5 | 5.4 |
| 3 | TEP PF$_6$ | Propylene carbonate | 109.8 | 5.5 |
| 4 | TPP ClO$_4$ | Propylene carbonate | 109.0 | 5.4 |
| 5 | TEP AsF$_6$ | Propylene carbonate | 110.0 | 5.6 |
| 6 | TEP SbF$_6$ | Propylene carbonate | 110.5 | 5.6 |
| 7 | TEP AlCl$_4$ | Propylene carbonate | 108.0 | 5.5 |
| 8 | TPP CF$_3$SO$_3$ | γ-Butyrolactone | 105.0 | 5.4 |
| 9 | TMP CF$_3$SO$_3$ | " | 104.2 | 5.4 |
| 10 | TEP CF$_3$SO$_3$ | Propylene carbonate and γ-butyrolactone (7:3) | 109.5 | 5.5 |
| 11 | TEP BF$_4$ | Propylene carbonate and γ-butyrolactone (7:3) | 112.4 | 5.5 |
| 12 | TEP ClO$_4$ | Propylene carbonate and γ-butyrolactone (7:3) | 109.4 | 5.5 |
| 13 | TEP SbF$_6$ | Propylene carbonate and γ-butyrolactone (7:3) | 110.5 | 5.5 |
| 14 | LiBF$_4$ | Propylene carbonate | 85.0 | 4.8 |

EXAMPLES 15 to 31

In each of the Examples of the present invention and the Comparative Examples, a unit cell (diameter: 20 mm, thickness 2.0 mm) of a coin-shaped electric double layer capacitor as shown in FIG. 1 was prepared as follows.

Firstly, 10% by weight of polytetrafluoroethylene was added to activated carbon powder (specific surface area: 2000 m$^2$/g), and the mixture was formed into a sheet by a wet-type kneading. The sheet thus obtained, was punched out to obtain disc-shaped polarizable electrodes 1 and 2 (diameter: 15 mm, thickness: 0.7 mm). These polarizable electrodes 1 and 2 facing to each other with a separator 3 of a non-woven fabric of polypropylene fiber interposed therebetween, were placed in a container comprising a stainless steel cap 4 and a stainless steel can 5. Then, the predetermined electrolyte solution is injected in the unit cell so that the polarizable electrodes 1 and 2 and the separator 3 were adequately impregnated with this electrolyte solution. Then, the edges of the cap 4 and the can 5 were caulked with a polypropylene packing 6 interposed therebetween, for sealing and integration.

By using the unit cell of an electric double layer capacitor prepared as described above, the initial capacity and the internal resistance upon application of a voltage of 2.8 V were measured with respect to each of cells containing various electrolyte solutions containing 1.0 M/liter of the phosphonium salts as shown in Table 2, as solutes. Then, each cell was stored at 70° C. for 1000 hours while continuously applying a voltage of 2.8 V thereto, whereupon the capacity deterioration rate (%) from the initial capacity was calculated. The results of these measurements are shown in Table 2 (Examples 15 to 31, and Comparative Examples 1 and 2).

The internal resistance was measured by an alternate current two-terminal method (frequency: 1 KHz), and the results are shown in Table 2.

TABLE 2

| | Solute | Solvent | Capacitor properties Initial capacity | Capacity deterioration rate (%) | Internal resistance (Ω) |
|---|---|---|---|---|---|
| Example 15 | (CH$_3$)$_2$(C$_2$H$_5$)$_2$P.BF$_4$ | Propylenecarbonate | 2.49 | 2.9 | 4.7 |
| Example 16 | (CH$_3$)$_2$(C$_2$H$_5$)$_2$P.PF$_6$ | " | 2.52 | 4.9 | 6.2 |
| Example 17 | (CH$_3$)$_2$(C$_2$H$_5$)$_2$P.ClO$_4$ | " | 2.39 | 5.2 | 6.1 |
| Example 18 | (CH$_3$)$_2$(C$_2$H$_5$)$_2$P.AsF$_6$ | " | 2.35 | 3.2 | 8.0 |
| Example 19 | (CH$_3$)$_2$(C$_2$H$_5$)$_2$P.SbF$_6$ | " | 2.36 | 3.5 | 7.8 |
| Example 20 | (CH$_3$)$_2$(C$_2$H$_5$)$_2$P.AlCl$_4$ | " | 2.32 | 4.2 | 6.5 |
| Example 21 | (CH$_3$)$_2$(C$_2$H$_5$)$_2$P.CF$_3$SO$_3$ | " | 2.47 | 3.1 | 4.5 |
| Example 22 | (C$_2$H$_5$)$_2$(C$_4$H$_9$)$_2$P.BF$_4$ | " | 2.52 | 3.2 | 5.1 |
| Example 23 | C$_3$H$_7$(C$_4$H$_9$)$_3$P.BF$_4$ | " | 2.43 | 4.8 | 6.2 |
| Example 24 | (C$_6$H$_5$)$_3$C$_2$H$_5$P.BF$_4$ | " | 2.35 | 5.3 | 7.2 |
| Example 25 | (CH$_3$)$_2$(C$_2$H$_5$)$_2$P.BF$_4$ | Sulfolane | 2.25 | 0.8 | 11.2 |
| Example 26 | (C$_2$H$_5$)$_4$P.BF$_4$ | Propylenecarbonate | 2.53 | 3.2 | 4.5 |
| Example 27 | (C$_3$H$_7$)$_4$P.BF$_4$ | " | 2.40 | 4.4 | 5.7 |
| Example 28 | (C$_4$H$_9$)$_4$P.BF$_4$ | " | 2.42 | 3.1 | 5.3 |
| Example 29 | (C$_2$H$_5$)$_4$P.PF$_6$ | " | 2.47 | 2.9 | 4.4 |
| Example 30 | (C$_4$H$_9$)$_4$P.PF$_6$ | " | 2.42 | 2.7 | 5.2 |
| Example 31 | (C$_4$H$_9$)$_4$P.BF$_4$ | Sulfolane | 2.13 | 0.8 | 10.9 |
| Comparative Example 1 | (C$_2$H$_5$)$_4$N.BF$_4$ | Propylenecarbonate | 2.20 | 32.5 | 9.9 |
| Comparative Example 2 | (C$_2$H$_5$)$_4$N.BF$_4$ | Sulfolane | 2.05 | 5.8 | 18.5 |

As described in the foregoing, according to the present invention, it is possible to obtain an electric double layer capacitor having a low internal resistance and excellent dependability for a long period of time as the capacity deterioration rate is low even under a high temperature condition.

We claim:

1. An electric double layer capacitor utilizing an electric double layer formed by the interface of an electrolyte solution and polarizable electrodes, wherein the electrolyte solution comprises a quaternary phosphonium salt of the formula I dissolved in an organic solvent:

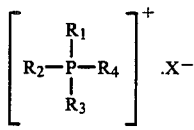

wherein each of $R_1$, $R_2$, $R_3$ and $R_4$ is a hydrogen atom, an alkyl group having from 1 to 15 carbon atoms or an aryl group having from 6 to 15 carbon atoms, provided that not all of $R_1$ to $R_4$ are hydrogen atoms, and X is $BF_4$, $PF_6$, $ClO_4$, $AsF_6$, $SbF_6$, $AlCl_4$ or $R_fSO_3$ wherein $R_f$ is a fluoroalkyl group having from 1 to 8 carbon atoms.

2. The capacitor according to claim 1, wherein the quaternary phosphonium salt is of an asymmetrical type wherein at least two different kinds of alkyl or aryl groups are bonded to the phosphorus atom.

3. The capacitor according to claim 1, wherein the quaternary phosphonium salt is of a symmetrical type wherein the same kind of alkyl or aryl groups are bonded to the phosphorus atom.

4. The capacitor according to claim 1, wherein the alkyl group is a lower alkyl group having from 1 to 4 carbon atoms.

5. The capacitor according to claim 1, wherein the aryl group contains one or two benzene rings.

6. The capacitor according to claim 1, wherein X is $R_fSO_3$, $ClO_4$ or $BF_4$.

7. The capacitor according to claim 1, wherein the organic solvent is propylene carbonate, γ-butyrolactone, sulfolane or a mixture thereof.

8. The capacitor according to claim 1, wherein the solute concentration in the electrolyte solution is from 0.1 to 3 M.

9. An electrolyte solution for an electric double layer capacitor which comprises a quaternary phosphonium salt of the formula I dissolved in an organic solvent:

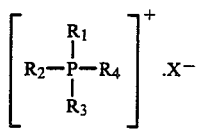

wherein each of $R_1$, $R_2$, $R_3$ and $R_4$ is a hydrogen atom, an alkyl group having from 1 to 15 carbon atoms or an aryl group having from 6 to 15 carbon atoms, provided that not all of $R_1$ to $R_4$ are hydrogen atoms, and X is $BF_4$, $PF_6$, $ClO_4$, $AsF_6$, $SbF_6$, $AlCl_4$ or $R_fSO_3$ wherein $R_f$ is a fluoroalkyl group having from 1 to 8 carbon atoms.

* * * * *